Nov. 3, 1925.
E. P. COLE
1,559,676
FURNACE
Filed July 2, 1923
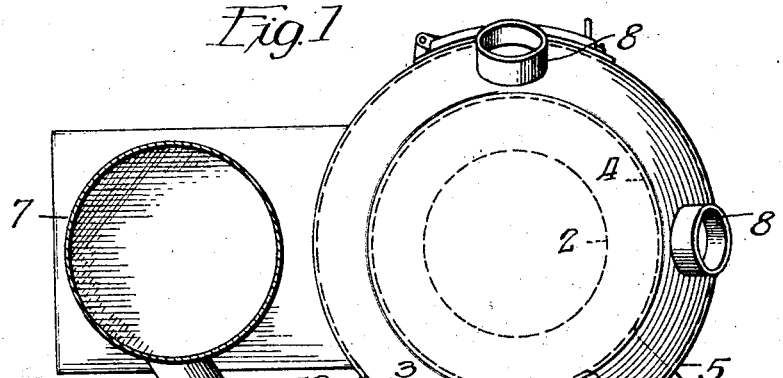
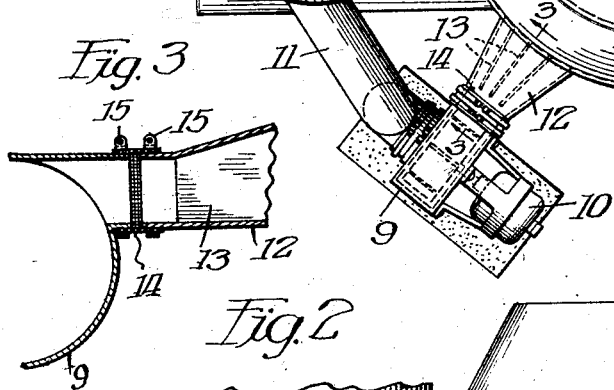
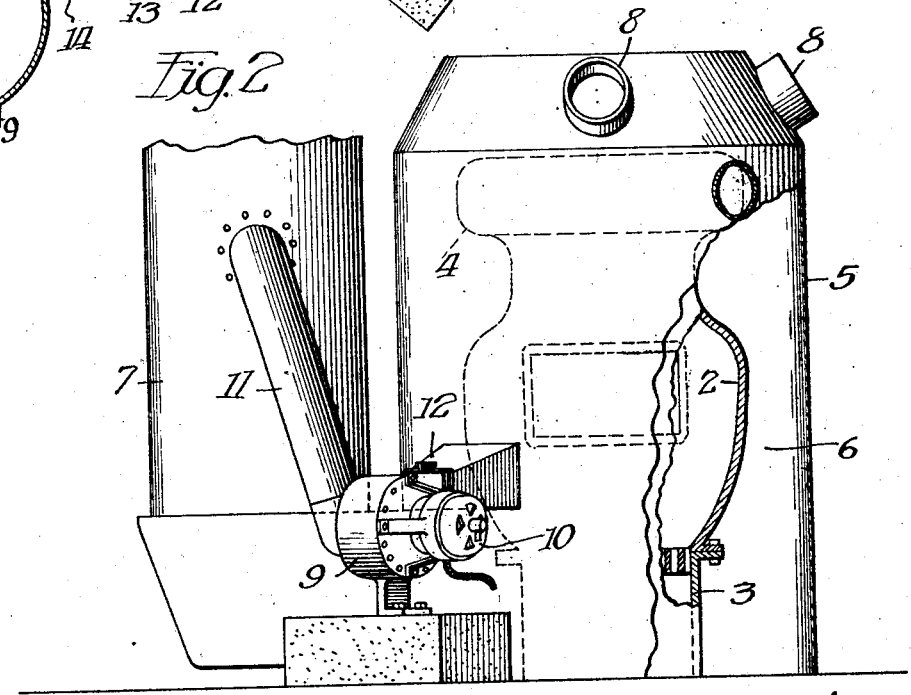
Inventor:
Edward P. Cole,
By Fisher, Fowle, Clapp y Soans Attys.

Patented Nov. 3, 1925.

1,559,676

UNITED STATES PATENT OFFICE.

EDWARD P. COLE, OF CHICAGO, ILLINOIS, ASSIGNOR TO COLE MANUFACTURING COMPANY, OF CHICAGO, ILLINOIS, A CORPORATION OF ILLINOIS.

FURNACE.

Application filed July 2, 1923. Serial No. 648,871.

*To all whom it may concern:*

Be it known that I, EDWARD P. COLE, a citizen of the United States, residing at Chicago, in the county of Cook and State of Illinois, have invented certain new and useful Improvements in Furnaces, of which the following is a specification.

My invention relates to hot air furnaces, and has reference more particularly to the method and means for circulating air through the air jacket of the furnace.

Air can be heated only by convection, and radiant heat therefore has no effect upon the air passing through a furnace, except as it strikes the outer wall and causes the latter to act as a convector. It is important, therefore to keep the temperature of the air heating walls below the point at which any considerable amount of radiant heat is developed.

The temperature of the heating walls of the furnace is governed largely by the volume of air passing through the air heating space, and in furnaces which depend upon gravity circulation, the volume of air is oftentimes insufficient, particularly at times of heavy firing, to prevent heating of the walls to the point of excessive radiation. This results in overheating of the outer casing and consequent waste of much heat in the basement or furnace room, and in addition the air passing through the pipes to the various parts of the building is so highly heated that there is considerable loss of heat through the pipes. Moreover, unhealthful air conditions are caused in the rooms and the furnace castings rapidly burn out.

With my invention, which may be readily applied to any furnace, a very large volume of air is circulated through the heating space so that the temperature of the heating walls is kept sufficiently low to avoid excessive radiation and waste of heat. This insures greater efficiency, avoids heating of the air to an unhealthful condition, supplies an abundance of fresh air to the rooms, and prolongs the life of the furnace castings. Moreover, the air is forced directly against the walls of the furnace which are most highly heated, so as to dissipate the heat of the walls rapidly and thereby further increases the efficiency of the furnace.

The principal objects of my invention are to provide an improved method and means for circulating the air through the air heating chamber of a hot air furnace; to increase the efficiency of the furnace; to arrange the air circulating device externally of the furnace and cold air duct; to arrange the device so that it does not interfere with or impede the natural circulation of air through the furnace when the circulating device is inoperative; to prevent communication of noise from the blower through the heating connections to the various parts of the building; to adapt the furnace to be used for cooling purposes in summer; and in general, to provide a simple and dependable air circulating device which may be attached to hot air furnaces of the ordinary type without requiring a special construction of the latter or extensive alterations thereof to permit the installation of the device.

On the drawings:

Fig. 1 is a top view of a furnace with an air circulating device applied thereto in accordance with my invention;

Fig. 2 a rear view of the structure shown in Fig. 1, with parts of the furnace broken away to disclose details of the construction; and Fig. 3 an enlarged sectional view on the line 3—3 of Fig. 1, showing the manner of connecting the blower with the furnace.

Referring to the drawings, I have indicated somewhat diagrammatically a hot air furnace of the usual type having the fire box 2, ash pit 3 and smoke drum 4 surrounded by an outer casing 5 to afford an air space 6, through which air is circulated so as to be heated. A large air duct 7 is connected to the casing 5 near the bottom for introducing air into the air space and one or more outlets 8 are provided at the top of the air space through which the heated air is supplied to the rooms which are to be heated. This arrangement of the cold air duct 7 at the lower end of the casing 5 and the outlets 8 at the upper end thereof causes a gravity circulation of air through the air space 6 due to the heating of the air in said space. Such circulation, however, is at times insufficient to obtain the greatest efficiency from the furnace and it is desirable to provide means to increase the circulation of air in the air space 6.

This is accomplished in my invention by providing a blower 9, at the exterior of the furnace and cold air duct 7, which is operated by a motor 10 and has the inlet connected by a pipe 11 to the air duct 7 at a distance from the discharge end of the latter, said pipe 11 being quite small in comparison with the size of the cold air duct 7. This blower 9 is preferably of the centrifugal type and has the outlet connected by a tapered or gradually expanded duct 12 with the casing 5 at a point just above or with its lower extremity substantially on a line with the top of the opening into the air space 6 from the air duct 7, as shown in Fig. 2, and said duct 12 is tilted upwardly at a slight inclination so as to discharge the air from the blower, with a slight upward impulse, against the fire pot of the furnace. Fins or division plates 13 are arranged in the inlet pipe 12 as shown by dotted lines in Fig. 1, to direct the air and prevent eddies and back currents. This duct 12 enters the air space 6 close at the side of the inlet opening from the duct 7 so that the direction of flow of the air from the pipes 7 and 12 is in the same general direction. This arrangement of the air inlet 12 above the air inlet 7, with a slight upward inclination and so as to discharge in the same general direction as the flow of air from the cold air duct 7, prevents the inrush of air from the blower opposing or retarding the flow of air through the duct 7 into the air space 6 and increases the volume of air flowing through the duct 7 into the air space 6.

To avoid transmission of noise from the blower through the furnace and pipes to the various parts of the building, flexible connections are provided between the blower inlet and outlet and the pipes 11 and 12, each of these connections comprising a short piece 14 of canvas tubing which has the opposite ends secured by clamps 15 respectively to the pipe 12 and blower outlet or the pipe 11 and blower inlet.

It will be observed that the parts composing this air circulating device are all arranged at the exterior of the furnace and cold air duct and that the device is capable of being readily attached to the ordinary type of hot air furnace without necessitating a special construction of the latter or extensive changes to adapt same to have the circulating device applied thereto.

While I have shown and described my invention in a preferred form, I am aware that various changes and modifications may be made without departing from the principles of my invention, the scope of which is to be determined by the appended claims.

I claim as my invention:

1. The combination with a furnace comprising inner and outer casings with an intermediate air heating space having an exhaust opening at the top and a cold air duct leading into the lower end thereof, of an air circulating device arranged outside of and permitting unobstructed circulation through the cold air duct and aforesaid air heating space, and comprising a smaller duct leading from the cold air duct and terminating at the outer casing of the furnace and having a blower interposed between the ends thereof for withdrawing air from the cold air duct and discharging same into the air heating space in an upward direction.

2. The combination with a furnace having inner and outer casings with an intermediate air heating space having an outlet at the top and a cold air duct leading into the lower end thereof at one side of the furnace, of an auxiliary duct of reduced size relative to the cold air duct having the outer end connected at an elevated point with the cold air duct at a distance from the furnace, extending in an inclined position and having the inner end extending laterally towards and communicating with the aforesaid air heating space in convergent relation to and adjacent the cold air duct so as to discharge against the wall of the inner casing in substantially the same direction as the cold air duct, and a blower in said auxiliary air duct for enforcing circulation through the auxiliary air duct from the cold air duct to the air heating space.

3. The combination with a furnace having inner and outer casings with an intermediate air heating space having an exhaust opening at the top and a cold air duct having a horizontal position leading into the lower end thereof, of an air circulating device comprising an auxiliary air duct arranged externally of the cold air duct and the air heating space and having the outer end connected to the cold air duct at an elevated position a distance from the furnace and the inner end terminating at and connected to the aforesaid outer casing so as to discharge laterally against the side of the inner casing of the furnace.

4. The combination with a furnace comprising a heater casing enclosed in a shell so as to form an air space therebetween, of an air duct leading into the lower end of said air space, a by-pass connected to the air duct at a distance from and above its point of connection with the shell and leading into said air space, and a blower in the by-pass for enforcing circulation of air through the latter from the air duct into the air space immediately above the point of connection of the duct with the air space.

5. In a furnace, the combination of a main heater casing having an elevated fire pot, an outer casing enclosing said heater casing and spaced therefrom so as to form an air space around the heater casing, said outer casing being provided with an outlet at the upper end and an inlet at the lower end, a vertical air duct having a lateral branch connected with said inlet, a by-pass smaller than the air duct connected with the air duct at an elevated position and leading into the outer casing so as to discharge against the fire pot, and a blower for enforcing circulation of air through the by-pass from the air duct to the air space within the outer casing.

6. In a furnace, the combination of a heater casing, an outer casing enclosing the heater casing so as to form an air space therearound, an air duct leading into the air space adjacent the lower end, a blower, a pipe leading from the air duct to the blower inlet, and a pipe leading from the blower outlet laterally into the aforesaid air space so as to discharge against the side of the heater casing and having spaced divergent walls from the outer end thereof to the inner end for distributing the air therefrom around the heater casing.

7. The combination of a furnace having a heater casing with an enclosing outer casing forming an air space therebetween, a cold air duct leading into the lower end of the air space, a blower having an outlet pipe communicating with the aforesaid air space so as to discharge against the side of the heater casing, and a plurality of laterally spaced separator on said outlet pipe for distributing the air around the heater casing.

8. The combination with a furnace and its cold air duct, of a blower outside the furnace and duct, a pipe connecting the cold air duct with the inlet of the blower and a pipe connecting the outlet of the blower with the furnace, both of said pipes comprising a section of flexible textile material interposed respectively between the blower and cold air duct and the blower and furnace so as to avoid communication of noise and vibration from the blower through the connections to the cold air duct and furnace.

EDWARD P. COLE.